United States Patent Office 3,051,734
Patented Aug. 28, 1962

3,051,734
METHOD OF MAKING DIGLYCERIDES
Sol B. Radlove, 5220 W. Van Buren St., Chicago, Ill.
No Drawing. Filed Nov. 23, 1959, Ser. No. 854,536
12 Claims. (Cl. 260—410.8)

This invention relates to shortening addition materials. More particularly it relates to shortening addition agents wherein fatty acids and hydroxy carboxylic acids are reacted with halohydrins. Still more particularly, it relates to diglyceride reaction products which are prepared from epihalohydrins, higher fatty acids and hydroxy carboxylic acid monovalent cation salts.

Shortenings, as the term is commonly employed in the art, comprises oils of vegetable or animal origin, either in the hydrogenated or natural state. The shortenings may be either in the liquid or in the normally solid or plastic physical state. Each of the physical states has advantages and disadvantages.

Plastic shortenings such as hydrogenated cottonseed oil and soya bean oils are costly and present problems of handling and storage, as well as processing problems to obtain optimum crystal structure making them more effective in the baking and allied industries.

Liquid shortenings, while having processing advantages have not received unqualified acceptance because, except in the case of specialized types of cakes, the products utilizing liquid shortening generally exhibit poor texture, low volume, etc.

In an effort to improve shortenings it has become the practice in recent years to admix with the basic oil component, fatty acid esters; namely, monoglycerides, diglycerides, polyglycerides or mixtures thereof. Although some of the agents have improved the nature of plastic shortenings by improvement of various properties particularly in relation to the preparation of cakes containing high ratios of sugar to flour, such agents have not been correspondingly effective in the production of normally liquid oil shortenings because the addition agents produced poor results in baking, and particularly where they are in the form of palmitic or stearic acid esters, precipitate out of the normally liquid oil shortenings at room temperatures.

Diglyceride esters have been prepared by reacting a glycidyl ester and a fatty acid at temperatures between 50° C. and 200° C. The product of reaction of glycidyl stearate and such fatty acids as palmitic acid is, for example, a 1-stearyl, 3-palmityl ester of glycerol. This product has limited utility in plastic shortening.

A material suggested for addition to shortenings, consists essentially of a mixture of glycerides. This mixture is prepared by reacting one mole of glycerine, one mole of fatty acid and one mode of lactic acid. The product of this reaction is a glyceride mixture which averages one to two moles of acid per mole of glycerine. This mixture is useful in plastic shortenings.

It has now been found that shortening additives consisting of a mixture of diglycerides, one of which diglycerides has the general formula

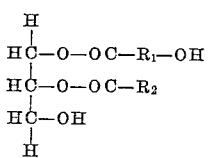

wherein $R_1$ is an aliphatic hydrocarbon group having 2 to 7 carbon atoms and $R_2$ is an aliphatic hydrocarbon having 12 to 20 carbon atoms, are markedly superior shortening agents and improve the texture, appearance, volume, etc., of cakes and baked goods prepared from any type shortening and are particularly useful in liquid shortenings.

Diglyceride mixtures containing a glyceride, for example, glyceryl ester with lactyl radical esterified in the one position and with a fatty acid radical, such as palmityl radical esterified in either the 2 or 3 position may be formed from a substantially anhydrous mixture of epihalohydrin, fatty acid, monohydroxy aliphatic carboxylic acid, in the presence of approximately one molecular equivalent of basic reacting ion per mole of hydroxy acid and in the presence of or in the absence of a solvent for said acids. Suitable solvents are the inert hydrocarbon compounds such as hexane, benzene, toluene, xylene, etc.

For optimum results, as measured by value as a shortening additive, components of the substantially anhydrous mixture should be reacted in the approximate proportions of 1 mole of epihalohydrin, 1 to 1.2 moles of monohydroxy aliphatic carboxylic acid, 1 to 1.1 moles of fatty acid and 1 molecular equivalent of basic reacting ion per mole of hydroxy acid present in the mixture, said basic reacting ion being selected from the group consisting of ammonium ion and alkali metal ions.

The reaction products show that reaction of components in the above proportions results in two reactions. At the one position of, for example, epichlorohydrin, condensation with elimination of sodium chloride occurs and a lactyl ester linkage is formed. During the reaction, the epoxy linkage is broken and a straight condensation occurs through which a fatty acid ester linkage is formed with the ester linkage being either at the 2 or at the 3 position but not at both positions.

Variation in the general length of the monohydroxy aliphatic carboxylic acids and the fatty acids makes it possible to vary the emulsification properties rather widely to suit them to different systems in which they are to be used. Thus the fatty acids may have 12 to 20 carbon atoms in the aliphatic chain although for shortening, a chain length of 14 to 18 carbon atoms is preferred. The hydroxy acids may have 2 to 10 carbon atoms in the aliphatic chain but for shortening additives, hydroxy acids of 2 to 4 carbon atoms in the aliphatic chain are preferred. When used in all-purpose shortenings, it has been found that the diglyceride mixture should be formulated so as to have one equivalent mole of myristic, palmitic and stearic acids individually or collectively per mole of glyceride esters and approximately 1 mole of lactic acid per mole of glyceride ester.

Lactic acid is the preferred hydroxy acid for forming the diglycerides esters of this invention. Other monohydroxy carboxylic acids such as glycollic acid, sarcolactic acid, hydracrylic acid, hydroxybutyric acid and malic acids may be used as well.

It is essential in order to obtain good yields of the diglyceride esters of this invention that the reaction be carried out under substantially anhydrous conditions. It is particularly difficult to obtain anhydrous products of reaction of hydroxy acids and water soluble basic-reacting alkali metal compounds such as caustic, potassium hydroxide, sodium carbonate, sodium bicarbonate, and the like. In addition, substantially anhydrous sodium lactate will not react in any appreciable degree with epichlorohydrin unless in true solution as differentiated from solvent dispersion.

Now it has been discovered that both of these difficulties can be overcome when monovalent basic-reacting cation, hydroxy acid and fatty acid are simultaneously present. One reason that the three components may be present simultaneously is that, for example, alkali metal salts of hydroxy acids are preferentially formed when hydroxy acid and fatty acids are reacted with alkali. Consequently, when the above components are present it does not matter whether the alkali metal ion is introduced independently, or as a salt of either acid, the mixture will react as though it were essentially alkali metal hydroxy acid and free fatty acid.

In addition, free fatty acid, in the absence of a solvent, will itself act as a solvent for alkali metal salt of hydroxy acid at elevated temperatures to form a dehydratable mixture which can be converted into an effective mixture for reaction with epichlorohydrin. In one mode of operation, sodium lactate is dehydrated to a syrup which may contain from 5 to 15% by weight of water. To the syrup is added an approximately equal molar quantity of fatty acid. Upon heating this solution under vacuum until a temperature of about 110° C. is attained water is removed. A substantially anhydrous solution is formed of sodium lactate in fatty acids when the pot temperature of the solution reaches about 135° C. to 145° C.

Upon adding one mole of epichlorohydrin to the solution to produce a reaction mixture of substantially equal molar amounts of each component, there is a vigorous reaction period during which the temperature is preferably maintained between about 120° C. and about 145° C. for one hour. Following this initial reaction period the temperature may be maintained constant for a period necessary to complete the reaction. Heating the reaction mixture to elevated temperatures in the range of 155° C. to 200° C. reduces the time necessary to complete the reaction. In general, an elevated temperature of 125° C. to 150° C. is preferred because it is believed that reaction at temperatures in this range favors the formation of the 1,2 isomer.

Alternatively, sodium lactate can be concentrated to a syrup condition under vacuum at temperatures of the order of 90° C. to 100° C. To the concentrated syrup may be added fatty acids such as stearic acid, palmitic acid, or mixtures thereof in quantities producing substantially equal molar proportions of fatty acid and hydroxy acid. A solvent, for example, toluene is added and the solution distilled to dehydrate the mixture by removal of an azeotropic mixture of solvent and water. When the pot temperature rises to between about 135° C. and 145° C., the mixture is substantially anhydrous.

At this point, epichlorohydrin is added and the reaction carried on under conditions to maintain the reaction mixture anhydrous. After the initial vigorous reaction period during which the temperature is maintained at about 135° C. to 145° C., and after a reaction completing treatment at temperatures between about 130° C. and 170° C., toluene is removed by vacuum distillation. Water washing of the solvent free reaction product removes sodium chloride and water soluble glyceryl derivatives. Alternatively, the glyceryl derivatives may be eliminated by steam distillation and the precipitated salt removed by filtration. The product is dried by heating under vacuum and filtered hot to produce a clear liquid.

Another order of steps for this process involves a toluene dehydration of sodium lactate by distilling off water as an azeotropic mixture until a substantially anhydrous mixture is obtained, adding epichlorohydrin to the substantially anhydrous dispersion of sodium lactate, stirring into the substantially anhydrous mixture the desired quantity of fatty acid, whereby sodium lactate is taken into solution, and heating the resultant solution to about 160° C. to effect the reactions of condensation with elimination of sodium chloride whereby the lactyl radical esterifies at the 1 position and the opening of the epoxy ring with fatty acid esterifying either at the 2 or 3 position.

The invention will be better understood from the following examples which are given by way of illustration and without any intention that the invention be limited thereto.

*Example I*

118 grams, i.e., 5% in excess over a 1 molar quantity, of lactic acid (80% concentration) is mixed with sodium hydroxide until the resultant mixture shows a pH of approximately 8. This reaction with lactic acid is carried out at a temperature of approximately 95° C. to 100° C. The reaction mixture is then subjected to vacuum of between 20 and 29 inches of mercury and a temperature of 90 to 100° C. to concentrate the sodium lactate to a gummy syrupy state. To this sodium lactate syrup is added 258 grams (1 mole) of palmitic acid of 90% purity (Armor "Neofat 16") and 100 milliliters of toluene. This reaction mixture is heated and an azeotropic mixture of toluene and water removed. Toluene is separated from the water and continuously returned to the system for distillation until the pot temperature rises from about 120° C. to about 135° C. At this point, 92½ grams (1 mole) of distilled epichlorohydrin is added. The reflux condenser of the reaction vessel is protected to maintain anhydrous conditions. A vigorous reaction takes place when the epichlorohydrin is added at a temperature of about 140° C. and the temperature is maintained at approximately this level for about 1 hour. The resultant mixture is then heated for 3 hours at a temperature maintained between 160° C. and 164° C.

After the 4 hour reaction period, toluene is distilled off under a vacuum of 20–29 inches of mercury at a temperature of about 110° C. The solvent free reaction product is then water washed with hot water of a temperature of 90° C. to 100° C. This water washing is accomplished by stirring the mixture of water and reaction product slowly and then allowing the separation of two phases, i.e., reaction product as a top phase and water as the bottom phase. Sodium chloride and soluble glycerol derivatives are found in the water phase which is removed.

After drying the diglyceride product on a steam bath under vacuum, 352.5 grams of product were recovered for a yield of 87%. The product has an acid value of 0.85 and a saponification number of 263.5.

This diglyceride mixture has good flavor and upon cooling is a light cream color.

*Example II*

118 grams, i.e., 5% in excess over a 1 molar quantity, of lactic acid (80% concentration) is mixed with sodium hydroxide until the resultant mixture shows a pH of approximately 8. This reaction with lactic acid is carried out at a temperature of approximately 95° C. to 100° C. The reaction mixture is then subjected to vacuum of between 20 and 29 inches of mercury and a temperature of 90° C. to 100° C. to concentrate the sodium lactate to a gummy syrupy state. To this sodium lactate syrup is added 282 grams (1 mole) of stearic acid of 90% purity (Armour "Neofat 18") and 100 milliliters of toluene. This reaction mixture is heated and an azeotropic mixture of toluene and water removed. Toluene is separated from the water and continuously returned to the system for distillation until the pot temperature rises from about 120° C. to about 135° C. At this point, 92½ grams (1 mole) of distilled epichlorohydrin is added. The reflux condenser of the reaction vessel is protected to maintain anhydrous conditions. A vigorous reaction takes place when the epichlorohydrin is added at a temperature of about 140° C. and the temperature is maintained at approximately this level for about 1 hour. The resultant mixture is heated for 3 hours at a temperature maintained between 160° C. and 164° C.

After the 4 hour reaction period, toluene is distilled off under vacuum of 20–29 inches of mercury at a temperature of about 110° C. The solvent free reaction product is then water washed with hot water of a temperature of 90° C. to 100° C. This water washing is accomplished by stirring the mixture of water and reaction product slowly and then allowing the separation of two phases, i.e., reaction product as a top phase and water as the bottom phase. Sodium chloride and soluble glycerol derivatives are found in the water phase which is removed.

After drying the diglyceride product on a steam bath under vacuum, 382.5 grams of product were recovered for a yield of 89.7%. The product has an acid value of 2.5 and a saponification number of 243.1.

This diglyceride mixture has good flavor and upon solidification is a light cream color. If the reaction mixture, prepared as described in Example II, is heated at lower temperatures of the order of 135° to 145° C. for an entire period of up to 6 hours a product is obtained which exhibits slightly different physical characteristics, the resultant product being a translucent material of a waxy amorphous nature.

*Example III*

118 grams (1 mole plus 5% excess) of lactic acid (80% concentration) was reacted with 50% sodium hydroxide solution by adding the alkali with agitation to the lactic acid, the solution being maintained hot on a hot plate until a pH of 8 was attained. The aqueous sodium lactate solution was concentrated to a syrup under vacuum of about 25 inches of mercury at approximately 95° C.

To the sodium lactate syrup was added 282 grams (1 mole) of stearic acid of 90% purity (Armour "Neofat 18") and the mixture stirred while maintaining a temperature of about 120° C. and under a blanket of inert gas until a homogeneous solution resulted. The homogeneous solution was then heated to 148° C. while maintaining a vacuum of 27 inches of mercury.

At this point, 92½ grams (1 mole) of distilled epichlorohydrin was slowly added to the solution. When the mixture was maintained at a temperature of about 140° C., salt formation occurred and the pot temperature quickly rose to 196° C. despite such temperature controlling operations as wrapping the flask in a cold wet towel. Upon standing, the temperature slowly dropped to 160° C. and was maintained at this level for about 3 hours while maintaining a blanket of nitrogen gas in contact with the reaction mixture to exclude atmospheric air. Following cooling of the reacted mixture to about 100° C., the reaction mixture was stirred in contact with boiling water to dissolve the salt and soluble glycerol derivatives. The aqueous layer was removed and discarded. After drying the diglyceride product on a steam bath under vacuum, 386 grams of product were recovered having a yield of approximately 90% of theory. This product had an acid value of 7.7.

*Example IV*

118 grams of lactic acid (80% concentration) was reacted with 50% sodium hydroxide solution by adding the alkali with agitation to the lactic acid which is maintained hot on a hot plate until a pH of 8 is attained.

The sodium lactate solution was dried under vacuum at a temperature of about 95° C. 100 milliliters of toluene was added and the mixture heated to distil off an azeotropic toluene-water mixture and to produce a sodium lactate concentrate.

To this toluene mixture was added 258 grams (1 mole) of palmitic acid of 90% purity (Armour "Neofat 16"). The mixture was heated to a temperature of approximately 130° C. and then 92½ grams (1 mole) of distilled epichlorohydrin was added.

Upon stirring for 10 minutes, the sodium lactate dissolved and a homogeneous reaction mixture was obtained. When the solution had become homogeneous, the temperature was raised to 140° C. This temperature was maintained for 1 hour, following which the temperature was raised to 165° C. and the mixture held at the latter temperature for 3 hours.

After the 4 hour reaction period, toluene was distilled off under vacuum of 20 to 29 inches of mercury at a temperature of about 110° C. The solvent free reaction product was then water washed with hot water at a temperature of 90° C. to 100° C. Water washed diglyceride ester product was dried under vacuum at a temperature of 100° C. to 110° C. and filtered hot. 344 grams of the water washed and dry product were recovered for a yield of approximately 85%. This product has an acid value of 7.6.

The value of the emulsifier as a shortening agent for cakes was tested by blending 4% of the product of Example I and 1% of citric acid ester of cottonseed oil monoglycerides and cetyl alcohol with liquid vegetable oil shortening component. The oil shortening component was utilized in the following household cake formula:

7¾ ozs. of cake flour
10¼ ozs. of granulated sugar
½ oz. of baking powder
¼ oz. of salt To the above dry ingredients was added 100 grams of shortening and 5 ozs. of liquid skim milk, the mixture being beaten for one minute at a medium speed in an electric mixer.

To this flour-shortening mixture was added 3 ozs. liquid skim milk, 4 ozs. of egg whites, 5 ml. vanilla extract and the mixture beaten for 3 minutes at a medium speed.

15 ozs. of the batter was deposited in an 8 inch cake pan and the batter baked at 375° F. for 25 minutes.

For comparison purposes, separate cakes were also prepared utilizing the identical household cake formula in which the shortenings were two commercially available plastic shortenings identified by A and B and a commercially available liquid shortening identified by the letter C. The shortening produced by blending oil and the emulsifier of Example I was identified by the letter D. The results were as follows:

|  | A | B | C | D |
|---|---|---|---|---|
| Specific Gravity of Batter | 0.93 | 1.00 | 1.01 | 0.91 |
| Volume of Cake (ml.) for 15 ozs. of Batter | 1,095 | 1,100 | 995 | 1,195 |
| Overall Rating of a Testing Laboratory Based on all Factors Considered; such as Shape, Texture, Crumb, Aroma, Flavor, etc | 86 | 86 | 71 | 92 |

Emulsifier prepared according to this invention, particularly the palmityl and stearyl esters may be used advantageously in both plastic and liquid shortenings because they have the property of incorporating air into batters and producing cakes of superior texture and greater volume than shortenings containing monoglyceride emulsifiers and other diglyceride emulsifiers.

The incorporation of air into batters is one of the primary functions of the emulsifiers in shortenings. When plastic shortenings are utilized, incorporation of air is less difficult because air is already present in the shortening and the higher viscosity of the plastic shortening tends to assist in the entrapment of air.

The value of the emulsifiers of Examples I, II and III were compared by baking cakes using the same recipe and utilizing various amounts of emulsifier in hydrogenated fat as indicated in the following table. The results were as follows:

|  | Specific Gravity Batter | Volume of 15 ozs. of Batter, ml. |
|---|---|---|
| 2½% of Emulsifier of Example I | 0.98 | 1,070 |
| 4% of Emulsifier of Example I | 0.88 | 1,145 |
| 4% of Emulsifier of Example I plus 1% of Citric Acid Ester | 0.94 | 1,240 |
| 3% of Emulsifier of Example II | 0.93 | 1,100 |
| 4% of Emulsifier of Example III | 0.94 | 1,135 |

The problem becomes more acute however when plastic shortenings are used in prepared dried mix cake compositions. In this instance, the plastic shortening is incorporated into the dry mixture of ingredients under condition to coat dry particles and thus little or no air remains associated with the product. It can be seen from the data supplied with regard to the cakes prepared with various amounts of shortening and the comparison with cakes prepared utilizing commercially available products, that the emulsifiers prepared in accordance with the instant invention have marked advantages, for example, in the prepared dry mix cake field.

The citric acid ester utilized in conjunction with the emulsifiers of this invention, may be prepared as follows:

1½ moles of cottonseed oil monoglycerides, 1½ moles of cetyl alcohol and 1 mole of citric acid are mixed and the mixture heated for 75 minutes at a temperature of 150° C. to 158° C. under nitrogen with a negative pressure sufficient to withdraw water vapor. Acid value of the reaction product is about 44.6. Similar useful supplemental agents may be prepared utilizing other monoglycerides.

Effective supplemental agents may also be prepared by reaction of monoglyceride esters with citric acid alone, as for example, by reacting 3 moles of cottonseed oil monoglycerides with 1 mole of citric acid under conditions such as are described above.

I claim:

1. The method of producing an essentially diglyceride ester mixture which comprises heating to a temperature in the range between about 120° C. and 200° C. epihalohydrin and a mixture substantially free of water comprising substantially equimolar amounts of fatty acid and hydroxy acid and monovalent basic reacting cation in molecular equivalent amounts for reaction with the amount of hydroxy acid present.

2. The process of claim 1 wherein the reaction mixture is dissolved in an organic solvent.

3. The method of producing an essentially diglyceride ester mixture which comprises removing water from a mixture having substantially equimolar quantities of fatty acid and monohydroxy carboxylic acid and monovalent basic reacting cation in molar equivalent amounts for reaction with monohydroxy aliphatic carboxylic acid to form a substantially dehydrated mixture, adding epihalohydrin and heating the resulting mixture to a temperature in the range between 120° C. and about 200° C., said epihalohydrin being present in quantities to produce a mixture of epihalohydrin, fatty acid and monohydroxy aliphatic carboxylic acid of substantially equal molar proportions.

4. The method of producing an essentially diglyceride ester mixture which comprises removing a major portion of the water from an aqueous solution of a monovalent cation salt of monohydroxy aliphatic carboxylic acid to form a concentrate, mixing concentrate and fatty acid to form a solution of said salt of monohydroxy aliphatic carboxylic acid in fatty acid, said solution having equimolar proportions of said salt and said fatty acid, removing water from the solution to produce a substantially anhydrous solution, adding epihalohydrin to the solution to form a mixture having equimolar proportions of components and heating the mixture to a temperature in the range between about 120° C. and 200° C.

5. The method of producing an essentially diglyceride ester mixture of 1,2 and 1,3 diglycerides in which the one position is esterified with monohydroxy aliphatic carboxylic acid which comprises admixing inert hydrocarbon solvent which forms azeotropic mixtures with water at temperatures below 145° C. with an aqueous solution of monovalent basic reacting cation salt of monohydroxy aliphatic carboxylic acid, heating the admixture to remove solvent-water azeotropes until the admixture is substantially dehydrated, mixing the dehydrated admixture with fatty acid and epihalohydrin in proportions producing a substantially equimolar mixture, heating said mixture to a temperature in the range between about 120° C. and 180° C., removing solvent from the resultant mixture, mixing hot water with the substantially solvent free resultant mixture to remove alkali metal halide and drying the water washed diglyceride ester product.

6. The method of producing an essentially diglyceride ester mixture of 1,2 and 1,3 diglycerides in which the one position is esterified with monohydroxy aliphatic carboxylic acid which comprises admixing inert hydrocarbon solvent which forms azeotropic mixtures with water at temperatures below 120° C. with aqueous solution of monovalent basic reacting cation salt of monohydroxy aliphatic carboxylic acid and with fatty acid, said alkali metal salt and fatty acid being in substantially equimolar proportions, heating the admixture to remove solvent-water azeotropes until the mixture is substantially dehydrated, mixing epihalohydrin with said dehydrated admixture and heating said resulting mixture to a temperature in the range between about 120° C. and 180° C., removing solvent from the reaction mixture, mixing hot water with the solvent free reaction mixture to remove alkali metal halide and dry the water washed diglyceride product.

7. The method of producing an essentially diglyceride ester mixture of 1,2 and 1,3 diglycerides in which the one position is esterified with monohydroxy aliphatic carboxylic acid which comprises removing a major portion of the water from an aqueous solution of monovalent basic reacting cation salt of monohydroxy aliphatic carboxylic acid by distillation under vacuum, admixing fatty acid and inert hydrocarbon solvent with said partially dehydrated alkali metal salt solution to form an admixture in which said salt and fatty acid are in substantially equimolar proportions, heating the admixture at temperatures below 145° C. to remove solvent-water azeotropes until a substantially dehydrated homogeneous solution is obtained, mixing epihalohydrin with the substantially dehydrated mixture, heating said mixture to a temperature in the range between 120° C. and 180° C., removing solvent from the resultant mixture, mixing hot water with the solvent free resultant mixture to remove halide salt and dry the water washed diglyceride product.

8. The method of producing an essentially diglyceride ester mixture of 1,2 and 1,3 diglycerides in which the one position is esterified with monohydroxy aliphatic carboxylic acid which comprises admixing an inert hydrocarbon solvent which forms azeotropic mixture with water at temperatures below 150° C. with an aqueous solution of alkali metal salt of monohydroxy aliphatic carboxylic acid, heating the admixture to remove solvent-water azeotropes until the admixture is substantially dehydrated, adding epihalohydrin while agitating the mixture, adding fatty acid and agitating the mixture until a homogeneous solution of alkali metal salt of monohydroxy aliphatic carboxylic acid in fatty acid, heating the mixture to a temperature in the range between 120° C. and 165° C., removing solvent from the reaction mixture, mixing hot water with the substantially solvent free reaction mixture to remove alkali metal halide and drying the water washed diglyceride ester product.

9. The method of producing an essentially diglyceride ester mixture of 1,2 and 1,3 diglycerides in which the one position is esterified with monohydroxy aliphatic carboxylic acid which comprises heating to a temperature in the range between about 130° C. and 170° C., a substantially dehydrated mixture having reaction components in the proportions of 1 mole of epihalohydrin, 1 to 1.2 moles of monohydroxy aliphatic carboxylic acid, 1 to 1.1 moles of fatty acid and 1 molecular equivalent of alkali metal ion per mole of hydroxy aliphatic carboxylic acid.

10. The method of producing an essentially diglyceride ester mixture of 1,2 and 1,3 diglycerides in which the one position is esterified with monohydroxy aliphatic carboxylic acid which comprises reacting lactic acid with sodium hydroxide, heating the aqueous solution of sodium lactate to a temperature of about 100° C. under vacuum to form a sodium lactate concentrate, adding palmitic acid and toluene to the aqueous sodium lactate solution, heating the mixture to distil off toluene-water azeotrope until the boiling point of the mixture rises to between 120° C. and 135° C., adding epichlorohydrin to the distilled mixture maintaining the reaction temperature below about 145° C. during the initial reaction period, holding the temperature of the reaction mixture to between 160 and 164° C. for an additional three hours, distilling the toluene from the mixture at a temperature of about 110° C. under vacuum, water washing the distilled reaction product to remove sodium chloride and drying the diglyceride ester product.

11. The method of producing an essentially diglyceride ester mixture of 1,2 and 1,3 diglycerides in which the one position is esterified with monohydroxy aliphatic carboxylic acid which comprises reacting lactic acid with sodium hydroxide to produce an aqueous lactate solution, removing water from said solution by heating under vacuum to produce a sodium lactate concentrate, adding stearic acid to the sodium lactate concentrate and heating the mixture under vacuum until the boiling temperature of the mixture reaches 135° C., adding epichlorohydrin to the vacuum treated mixture in proportion to produce in the solution substantially equimolar proportions of epichlorohydrin, fatty acid and sodium lactate, heating the mixture to a temperature not exceeding 200° C., cooling the mixture to about 100° C., washing the reaction mixture with water to remove sodium chloride and drying the diglyceride ester product under vacuum.

12. The method of producing an essentially diglyceride ester mixture of 1,2 and 1,3 diglycerides in which the one position is esterified with monohydroxy aliphatic carboxylic acid which comprises reacting lactic acid with sodium hydroxide solution, dispersing the sodium lactate solution in toluene, heating the dispersion under vacuum to distill off an azeotropic toluene-water mixture and produce a substantially dehydrated sodium lactate, adding epichlorohydrin and palmitic acid to the dehydrated sodium lactate dispersion, agitating the mixture until a homogeneous solution of sodium lactate in palmitic acid is obtained, heating the solution to 140° C. for 1 hour and completing the reaction by heating the mixture to 165° C. for an additional 2 hours, heating the resultant reaction mixture under vacuum to distill off the toluene, water washing the residual reaction product to remove sodium chloride and drying the resulting diglyceride ester product under vacuum.

References Cited in the file of this patent

UNITED STATES PATENTS

| | | |
|---|---|---|
| 2,290,583 | Dreger | July 21, 1942 |
| 2,290,609 | Goss | July 21, 1942 |
| 2,315,168 | Gordon | Mar. 30, 1943 |
| 2,690,971 | Iveson et al. | Oct. 5, 1954 |
| 2,910,490 | Malkemus | Oct. 27, 1959 |